(12) United States Patent
Alexander (10) Patent No.: US 9,582,505 B2
(45) Date of Patent: Feb. 28, 2017

(54) HANDLING USER-SPECIFIC INFORMATION FOR CONTENT DURING CONTENT-ALTERING OPERATIONS

(75) Inventor: Michael Alexander, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 2 days.

(21) Appl. No.: 13/071,279

(22) Filed: Mar. 24, 2011

(65) Prior Publication Data

US 2012/0246197 A1    Sep. 27, 2012

(51) Int. Cl.
| | | |
|---|---|---|
| *G06F 17/30* | (2006.01) | |
| *H04N 21/45* | (2011.01) | |
| *H04N 21/475* | (2011.01) | |
| *H04N 21/254* | (2011.01) | |

(52) U.S. Cl.
CPC .. *G06F 17/30038* (2013.01); *G06F 17/30035* (2013.01); *G06F 17/30017* (2013.01); *G06F 17/30867* (2013.01); *G06F 2221/2141* (2013.01); *H04N 21/2541* (2013.01); *H04N 21/4532* (2013.01); *H04N 21/4751* (2013.01)

(58) Field of Classification Search
CPC ............ H04N 21/4532; H04N 21/4751; G06F 17/30038; G06F 17/30017; G06F 17/30035; G06F 17/30867; G06F 17/3012; G06F 17/3028
USPC ....... 707/781, 732, 733, 734, 783, 784, 785; 725/25, 34, 133
See application file for complete search history.

(56) References Cited

U.S. PATENT DOCUMENTS

| | | | |
|---|---|---|---|
| 5,706,510 A | 1/1998 | Burgoon | |
| 7,831,643 B1 | 11/2010 | Beloussov et al. | |
| 7,860,887 B2* | 12/2010 | Cohen et al. | 707/781 |
| 7,870,580 B2* | 1/2011 | Haberman et al. | 725/35 |
| 7,917,924 B2* | 3/2011 | Haberman et al. | 725/35 |
| 7,958,139 B2* | 6/2011 | Frazier et al. | 707/769 |
| 8,103,590 B2* | 1/2012 | Quoc et al. | 705/52 |

(Continued)

OTHER PUBLICATIONS

International Search Report and Written Opinion of PCT/US12/29956 mailed on Jun. 21, 2012, 9 pages.

(Continued)

*Primary Examiner* — Dangelino Gortayo
(74) *Attorney, Agent, or Firm* — Kilpatrick Townsend & Stockton (57) ABSTRACT

A content player receives user-specific information from different users and associates the information with content. Subsequently, the player receives a request to perform a content-altering operation. In response, the player performs the operation such that the information for the requesting user is affected, but not the information for other users. The information may include a placeholder, an indication as to whether the content and/or the entire content has been accessed, a protection status indicating whether or not the content can be deleted, and so on. The information may be added to and/or configured to accompany and/or otherwise be associated with the content. The player may identify the user so that different information for different users can be associated with the content for the respective user, such as by prompting the user to select an identifier from a list or perform a "log in."

16 Claims, 10 Drawing Sheets

(56) References Cited

U.S. PATENT DOCUMENTS

| | | | | |
|---|---|---|---|---|
| 8,401,681 | B2* | 3/2013 | Rosenblatt | G06F 17/30058 381/123 |
| 8,418,206 | B2* | 4/2013 | Bryant et al. | 725/58 |
| 8,434,111 | B2* | 4/2013 | Levy et al. | 725/46 |
| 8,516,529 | B2* | 8/2013 | Lajoie et al. | 725/87 |
| 8,725,680 | B2* | 5/2014 | Abraham | H04W 4/02 707/609 |
| 8,818,179 | B1* | 8/2014 | Barton | 386/297 |
| 8,880,599 | B2* | 11/2014 | Svendsen et al. | 709/204 |
| 8,910,218 | B2* | 12/2014 | Tirasirikul et al. | 725/78 |
| 9,015,270 | B2* | 4/2015 | Cholas | 709/217 |
| 9,124,650 | B2* | 9/2015 | Maharajh | H04L 67/30 705/56 |
| 2005/0240588 | A1* | 10/2005 | Siegel et al. | 707/9 |
| 2007/0294246 | A1* | 12/2007 | Evans et al. | 707/6 |
| 2009/0205030 | A1 | 8/2009 | Ong | |
| 2009/0217352 | A1* | 8/2009 | Shen et al. | 726/3 |
| 2010/0027966 | A1* | 2/2010 | Harrang | H04N 5/775 386/241 |
| 2010/0070537 | A1* | 3/2010 | Amidon et al. | 707/802 |
| 2010/0235386 | A1* | 9/2010 | Zhao et al. | 707/769 |
| 2011/0004912 | A1* | 1/2011 | Teniou et al. | 725/118 |
| 2011/0072452 | A1* | 3/2011 | Shimy et al. | 725/25 |
| 2011/0138064 | A1* | 6/2011 | Rieger et al. | 709/228 |
| 2011/0167355 | A1* | 7/2011 | Shelansky et al. | 715/750 |
| 2012/0078997 | A1* | 3/2012 | Evans et al. | 709/203 |

OTHER PUBLICATIONS

Extended European Search Report for EP12760974 mailed Jan. 23, 2015, 38 pages.

Office Action by the Mexican Institute of Industrial Property for Mexican Patent Application No. MX/a/2013/010745 dated Feb. 27, 2015, 2 pages.

International Preliminary Report on Patentability for PCT/US2012/029956 issued Sep. 24, 2013, 8 pagess.

Notice of Allowance for Mexican Patent Appln. No. MX/a/2013/010745, 1 page.

Office Action dated Jul. 29, 2015 from the Mexican Patent Office for Mexican Patent Appln. No. MX/a/2013/010745 , 2 pages.

* cited by examiner

HANDLING USER-SPECIFIC INFORMATION FOR CONTENT DURING CONTENT-ALTERING OPERATIONS

FIELD OF THE INVENTION

This disclosure relates generally to playable content, and more specifically to handling user alterations of playable content that is associated with user-specific information for multiple different users.

SUMMARY

The present disclosure discloses systems, methods, and computer program products for handling user-specific information for content during content-altering operations. A content player may receive user-specific information from a number of different users and associate such user-specific information with at least one instance of content. Subsequently, the content player may receive a request for the content player to perform an operation on the instance of content that will alter the instance of content, such as a request to delete the instance of content, a request to move the instance of content, or similar operations that will alter the instance of content. In response to receiving the request, the content player may perform the operation such that the user-specific information for a user who requested the operation is affected but the user-specific information for other users is not affected.

The user-specific information may be any kind of information and/or metadata regarding relationships between the content and one or more users. For example, the user-specific information may include, but is not limited to, a last-watched placeholder in the instance of content, an indication as to whether the instance of content has been accessed, an indication as to whether the entirety of the instance of content has been accessed, a protection status indicating whether or not the instance of content can be deleted, and/any other information regarding the instance of content and a user. In some implementations the user-specific information may be added to the instance of content whereas in other implementations the user-specific information may be configured to accompany the instance of content and/or otherwise configured to be associated with the instance of content.

The content player may identify the user that corresponds to the user-specific information so that different user-specific information for different users of a plurality of different users can be associated with the instance of content for the respective user. In some implementations the content player may prompt a user to select an identifier from a list in order to identify the user that corresponds to particular user-specific information. In other implementations the content player may prompt a user to "log in" in order to identify user-specific information received during a particular log in session with a particular user.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Content players (such as television receivers, set top boxes, digital video recorders, digital video disc players, satellite radios, digital music players, computers, mobile computing devices, tablet computing devices, smart phones, cellular telephones, and so on) generally present content (such as audio content, video content, and so on) via one or more presentation devices (such as televisions, speakers, computer monitors, cathode ray tube displays, liquid crystal displays, plasma screen displays, and so on). Such content players may play and/or store content received from one or more content providers (such as one or more cable television programming providers, satellite television programming providers, Internet service providers, video on demand providers, pay-per-view movie providers, digital video disc retailers, and so on) via one or more communication and/or distribution links (such as one or more satellite communication links, coaxial cable communication links, cellular communication links, Internet communication links, WiFi communication links, Bluetooth® communication links, physical distribution networks, and so on).

Content players may also associate various kinds of user-specific information (such as metadata) with content. By way of a first example, a content player may record one or more placeholders for a user such as a marked position in the content (such as the last position the user accessed). By way of a second example, a content player may record one or more statuses of the content for a user, such as whether the user has accessed the content, whether the user has accessed the entirety of the content, whether the content is protected from deletion, one or more parental control settings the user specifies for the content, and so on. Such user-specific information may be added to the content and/or may otherwise configured to correspond to the content.

However, when user-specific information for multiple different users is associated with content, difficulties may arise when the content is altered. For example, if multiple different users have marked an instance of content with placeholders and one of the users moves the instance of content (deleting the instance of content from the source storage location after copying it to a destination location), the instance of content along with the placeholders for all of the multiple different users may only be stored in the destination location. This may not be the intended result in scenarios where one user wishes to move the instance of content but the other users still wish to access the content from the original location. The content player may not be capable of altering the instance of content such that user-specific information for one user is affected without affecting the user-specific information for other users.

The present disclosure discloses systems, methods, and computer program products for handling user-specific information for content during content-altering operations. A content player may associate user-specific information received from a plurality of different users with at least one instance of content. The content player may receive one or more requests to perform one or more operations on the instance of content from a user that will alter the instance of content. In response, the content player may perform the one or more operations such that the user-specific information for the requesting user is affected but the user-specific information for other users is not affected.

Figure 1:
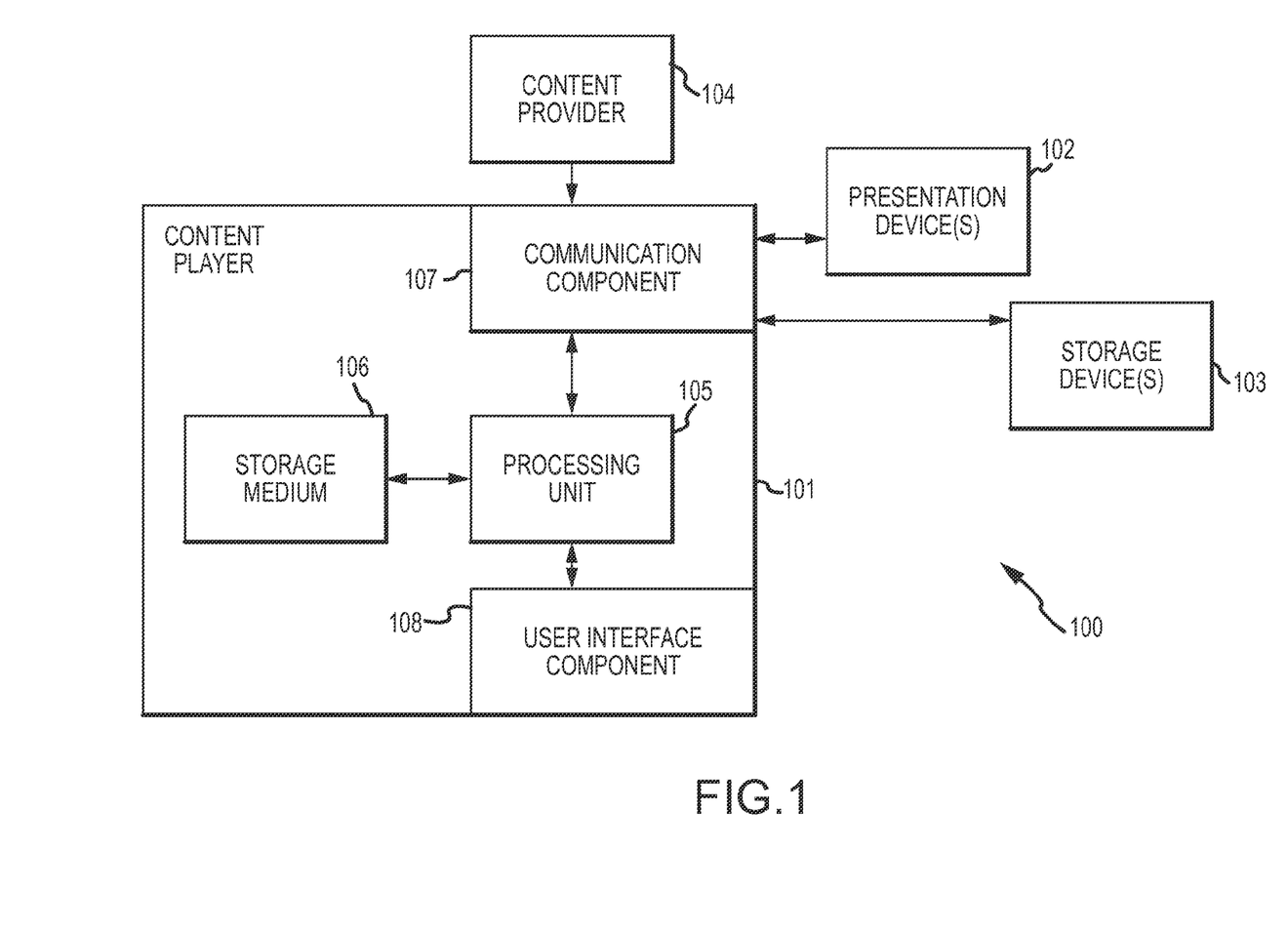
FIG. 1 is a block diagram illustrating a system for handling user-specific information for content during content-altering operations.

FIG. 1 is a block diagram illustrating a system 100 for handling user-specific information for content during content-altering operations. The system 100 includes a content player 101 which may be a television receiver, a set top box, a digital video recorder, a digital video disc player, a satellite radio, a digital music player, a computer, a mobile computing device, a tablet computing device, a smart phone, a cellular telephone, and/or any other device capable of playing content (such as video, audio, and/or data content).

The content player 101 may include one or more processing units 105, one or more non-transitory storage media 106 (which may take the form of, but is not limited to, a magnetic storage medium; optical storage medium; magneto-optical storage medium; read only memory; random access memory; erasable programmable memory; flash memory; and so on), one or more communication components 107, and one or more user interface components 108. The content player may transmit content for presentation utilizing one or more presentation devices 102 (such as one or more televisions, speakers, computer monitors, cathode ray tube displays, liquid crystal displays, plasma screen displays, and/or other content presentation devices) via the communication component. The content transmitted by the content player may be content stored in the non-transitory storage medium and/or received via the communication component from one or more content providers 104 (such as a cable television programming provider, a satellite television programming provider, an Internet service provider, a video on demand provider, a pay-per-view movie provider, a digital video disc retailer, and/or other provider of content) via one or more communication and/or distribution links (such a satellite communication link, a coaxial cable communication link, a cellular communication link, an Internet communication link, a WiFi communication link, a Bluetooth® communication link, a physical distribution network, and/or any other communication link). The content player may transmit the content to the presentation device (and/or perform other actions such as store content received from the content provider in the non-transitory storage medium) in response to user input received from one or more user input devices (such as a remote, a keyboard, a virtual keyboard, a mouse, a touch pad, and/or other user input device) via the user interface component.

The content player 101 may associate user-specific information (i.e., metadata) for a number of different users with one or more instances of content. Such user-specific information may include any kind of information regarding any relationship between a user and the instance of content (such as a last-watched placeholder in the instance of content for the user, an indication as to whether the user has accessed the instance of content, an indication as to whether the user has accessed the entirety of the instance of content, a protection status for the user indicating whether or not the instance of content can be deleted for the user, and/any other information regarding the instance of content with respect to the user and/or the user with respect to the instance of content). Such associated information may be added to the instance of content, configured to accompany the instance of content, and/or otherwise configured to be associated with the instance of content. Further, the content player may identify the user that corresponds to the user-specific information (such as by having the user select an identifier from a list utilizing a remote and/or other input device) so that different user-specific information for different users of a plurality of different users can be associated with the instance of content for the respective user.

While the content player 101 operates, the content player may determine to alter one or more instances of content (such as deleting, moving, and/or otherwise performing operations that alter an instance of content). For example, the content player may determine to alter one or more instances of content in response to user input received via the user interface component 108. If the instance of content to be altered is associated with user-specific information for multiple different users, the content player may determine which user is instructing to alter the instance of content (such as by having the user select an identifier from a list utilizing a remote and/or other input device and/or retrieving a stored previous selection from such a list) and may perform the alteration of the instance of content such that the user-specific information for that user is affected by the alteration without affecting the user-specific information for other users that is associated with the instance of content.

By way of a first example, an instance of content stored in the non-transitory storage medium 106 may include user-specific information for a number of different users. The content player 101 may receive input from a particular user via the user interface component 108 that instructs the content player to move the instance of content to a storage device 103 other than the non-transitory storage medium 106. In this first example, the content player may be configured to only allow the instance of content to exist on a single storage medium for a user at a time. Thus, if the content player moves the instance of content to the storage device 103, the content player deletes the instance of content from the source non-transitory storage medium 106. However, as the content player is moving the instance of content for only a particular user, the content player may copy the instance of content and the user-specific information for the particular user, but not other users, to the storage device 103 and remove the user-specific information for the particular user from the instance of content stored on the non-transitory storage medium 106. Subsequently, the particular user may be able to access the instance of content stored on the storage device 103, but not the instance of content stored on the non-transitory storage medium 106 (and/or access information that indicates that the instance of content is stored on the non-transitory storage medium 106 such that the instance of content does not appear in a listing of stored content for the non-transitory storage medium 106). In this way, the content player may accomplish the instruction to alter the instance of content for the particular user without affecting the user-specific information for other users that is associated with the instance of content.

By way of a second example, an instance of content stored in the non-transitory storage medium 106 may include protection statuses, indicating whether or not the instance of content can be deleted, for a number of different users. If the content player 101 receives input from a particular user indicating to delete the instance of content, and the protection status for that user indicates that the instance of content can be deleted, the content player may un-associate (delete)

user-specific information for the particular user. Subsequently, the particular user may be able to access the instance of content and/or access information that indicates the presence of the instance of content such that the instance of content does not appear in a listing of content. Thus, the content player may be able to delete an instance of content for a user but not others by maintaining separate user-specific protection statuses for the different users.

Figure 2:
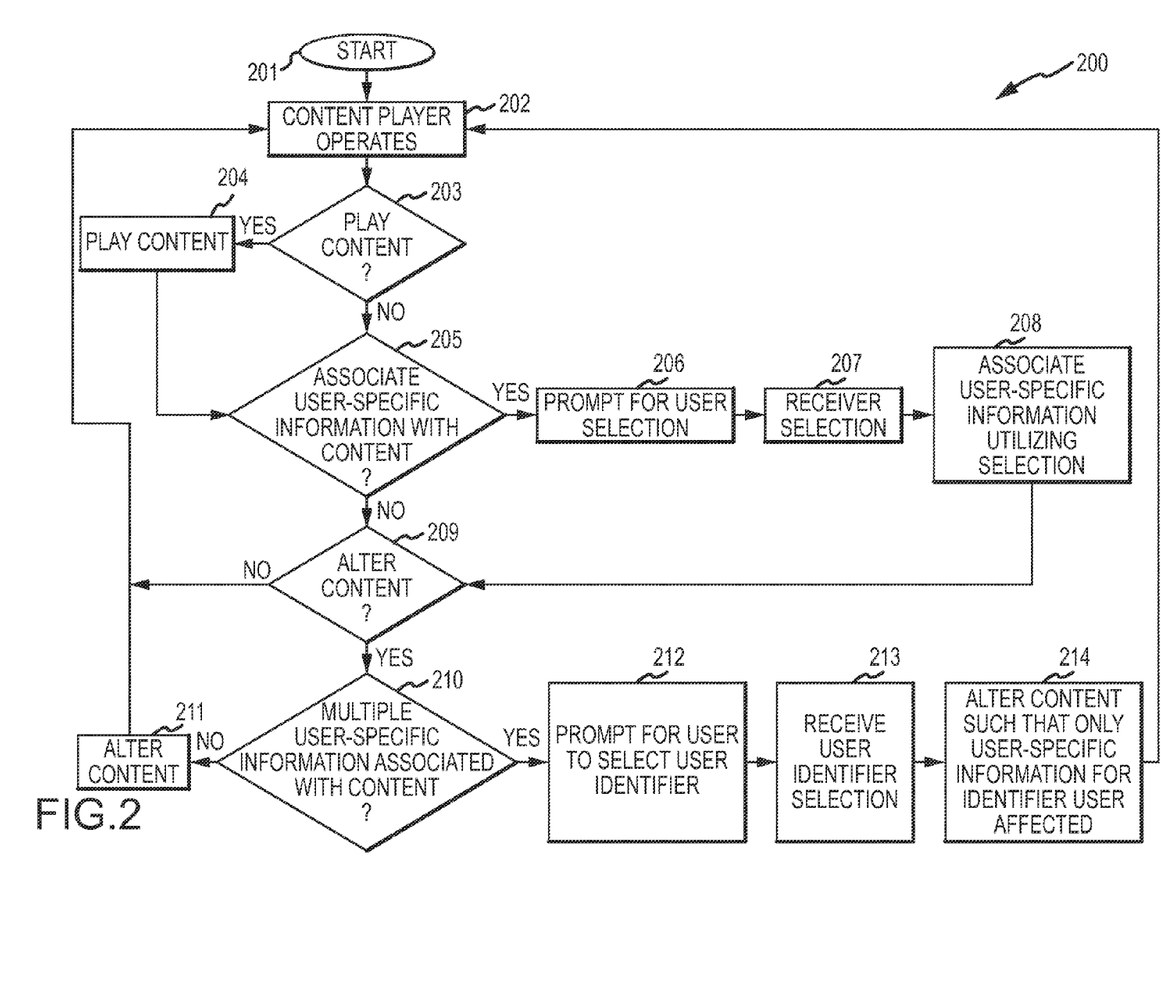
FIG. 2 is a flow chart illustrating a method for handling user-specific information for content during content-altering operations. This method may be performed by the system of FIG. 1.

FIG. 2 illustrates a method 200 for handling user-specific information for content during content-altering operations. The method 200 may be performed by the content player 101 of FIG. 1. The flow begins at block 201 and proceeds to block 202 where the content player operates. The flow then proceeds to block 203 where the processing unit 105 determines whether or not to play content. The processing unit may determine to play content that is stored in the non-transitory storage medium 106 and/or received from the content provider 104 in response to user input received via the user interface component 108. If so, the flow proceeds to block 204 where the transmits the content to the presentation device 102 before the flow proceeds to block 205. Otherwise, the flow proceeds directly from block 203 to 205.

At block 205, the processing unit 105 determines whether or not to associate user-specific information with an instance of content. The processing unit may determine to associate user-specific information with an instance of content in response to user input received via the user interface component 108. If so, the flow proceeds to block 206. Otherwise, the flow proceeds to block 209.

At block 206, after the processing unit 105 determines to associate user-specific information with an instance of content, the processing unit 105 prompts a user to select a user identifier from a list of user identifiers. The flow then proceeds to block 207 where the processing unit receives the user's selection. Next, the flow proceeds to block 208 where the processing unit associates the user-specific information with the instance of content as user-specific information for the used based on the received selection. The flow then proceeds to block 209.

At block 209, the processing unit 105 determines whether or not to alter an instance of content. The processing unit may determine to alter an instance of content in response to user input received via the user interface component 108. If not, the flow returns to block 202 where the content player 101 continues to operate. Otherwise, the flow proceeds to block 210.

At block 210, the processing unit 105 determines whether or not the instance of content to be altered is associated with user-specific information for multiple different users. If not, the flow proceeds to block 211 where the processing unit alters the instance of content before the flow returns to block 202 where the content player 101 continues to operate. Otherwise, the flow proceeds to block 212.

At block 212, the processing unit 105 identifies a user related to the determined alteration of the instance of content by prompting the user to select a user identifier from a list of user identifiers. The flow then proceeds to block 213 where the processing unit receives the selected user identifier. Next, the flow proceeds to block 214 where the processing unit alters the instance of content such that only the user-specific information for the identified user is affected. As such, user-specific information associated with the instance of content for other users is not affected. The flow then returns to block 202 where the content player 101 continues to operate.

The method 200 is illustrated and described above as prompting a user to select from a list of user identifiers to identify the user for which user-specific information is to be associated and/or the user for which alteration of an instance of content is to be performed. However, it is understood that this is an example and other approaches for identifying a user related to user-specific information and/or alteration of an instance of content are possible without departing from the scope of the present disclosure. For example, a user may "log in" when first utilizing a content player and the content player may utilize log in information provided by that user for subsequent association of user-specific information and/or alteration of instances of content.

FIGS. 3A-3H are diagrams illustrating a user 301A-301H utilizing a system 300A-300H for handling user-specific information for content during content-altering operations. The system 300A-300H may be the system of FIG. 1. The system 300A-300H may include a set top box 302A-302H that is connected to a television 303A-303H (which includes a screen 304A-304H) and a external hard drive 306A-306H and is controllable by the user 301A-301H utilizing a remote control 305A-305H.

Figure 3A:
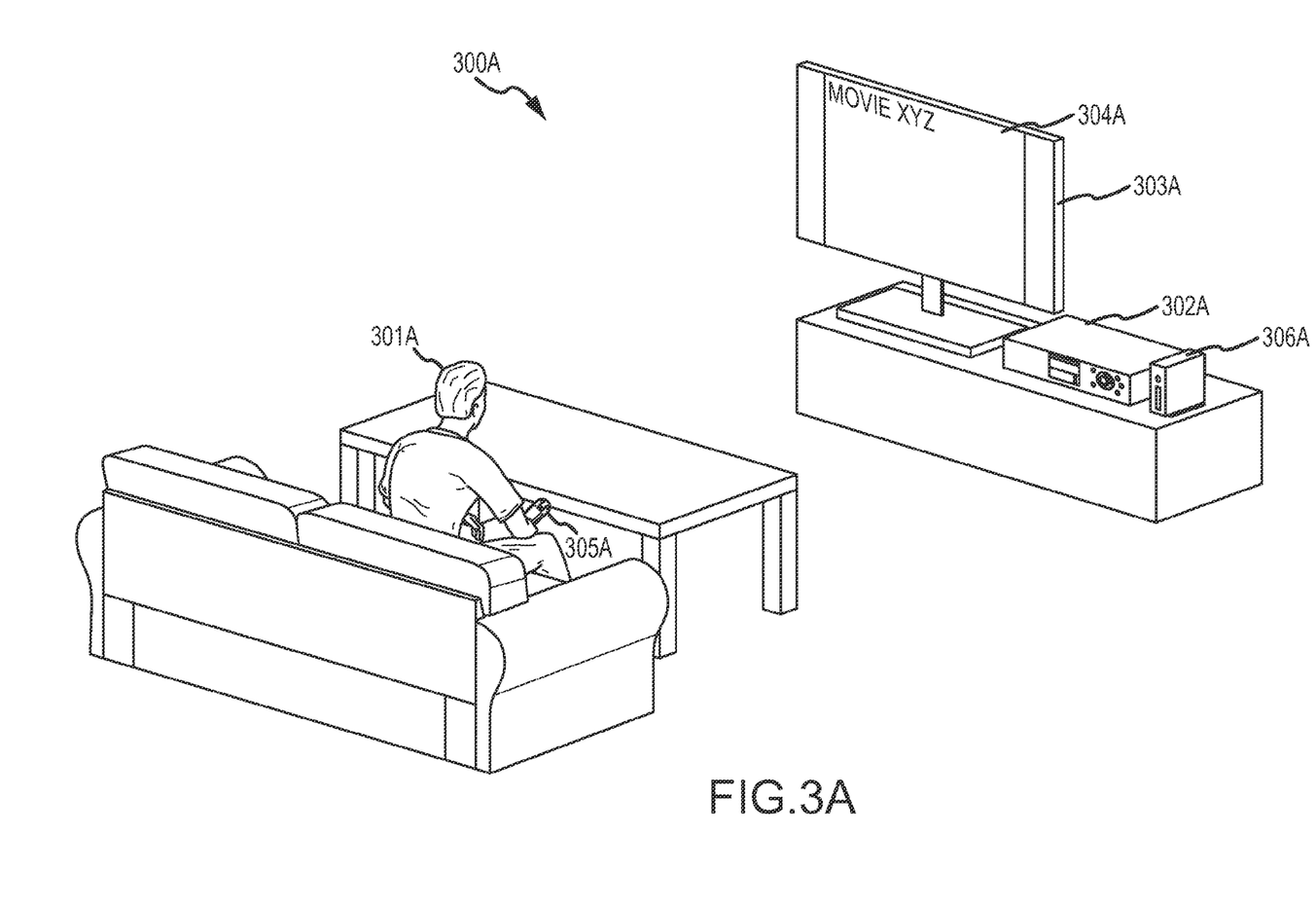
FIGS. 3A-3H are diagrams illustrating a user utilizing a system for handling user-specific information for content during content-altering operations. The system may be the system of FIG. 1.
Figure 3B:
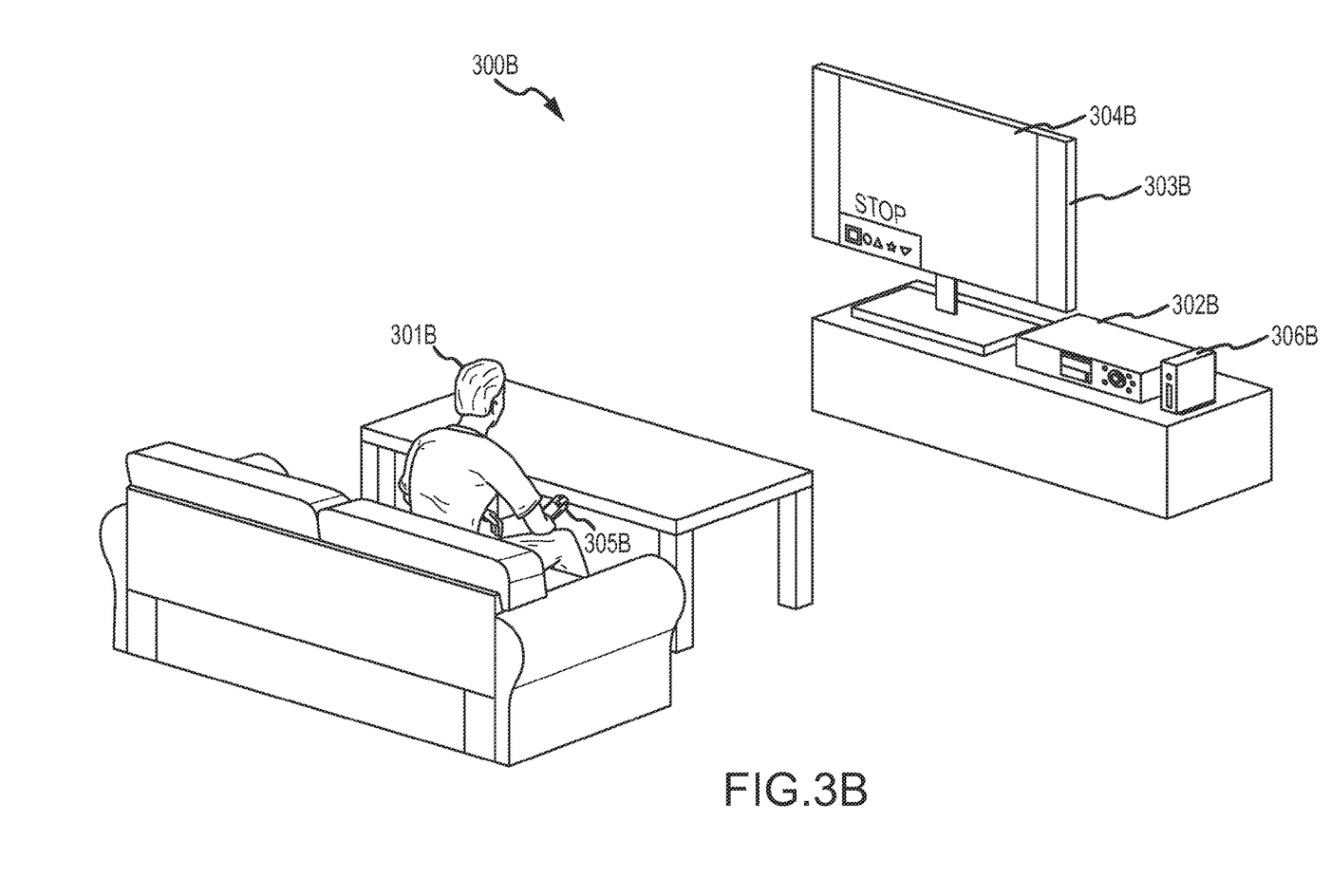

As illustrated in FIG. 3A, the set top box 302A is displaying Movie XYZ on the screen 304A of the television 303A. As illustrated in FIG. 3B, the user 301B utilizes the remote control 305B to stop play of the movie. As a result, the set top box 302B prepares to record a last-watched placeholder for the user 302B. As illustrated, as part of that process, the set top box 302B displays a list of user identifiers so that the user 302B may identify himself and the user 302B utilizes the remote control 305B to select the "square" user identifier. The set top box 302B then records a last-watched placeholder associated with Movie XYZ of the user 302B, identified by the square user identifier.

Figure 3C:
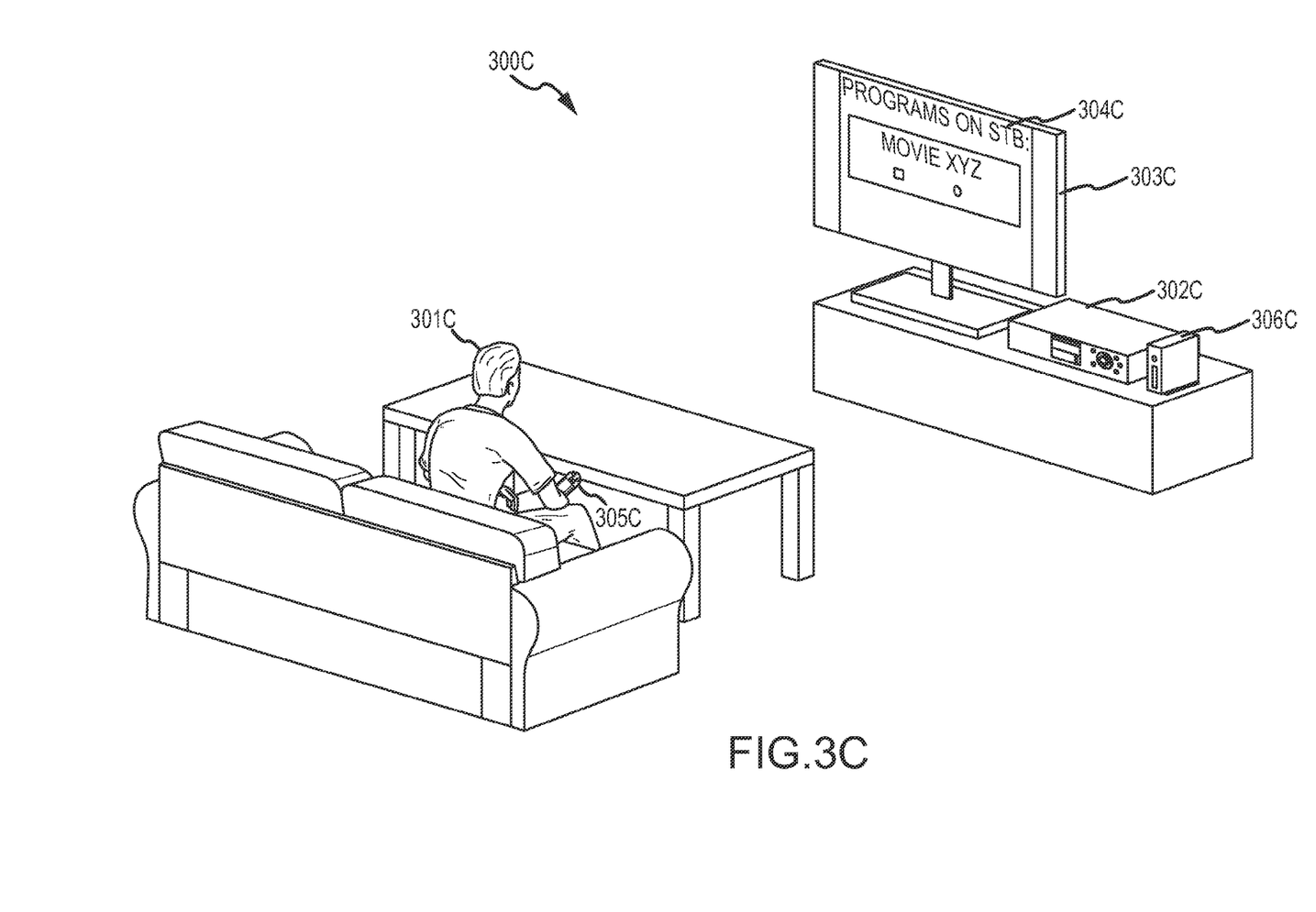

As illustrated in FIG. 3C, the set top box 302C may subsequently display a list on the screen 304C of the television 303C that identifies programs stored by the set top box 302C. As illustrated, the set top box 302C stores the Movie XYZ which includes last-watched placeholders for the user identified by the square user identifier and a circle user identifier.

Figure 3D:
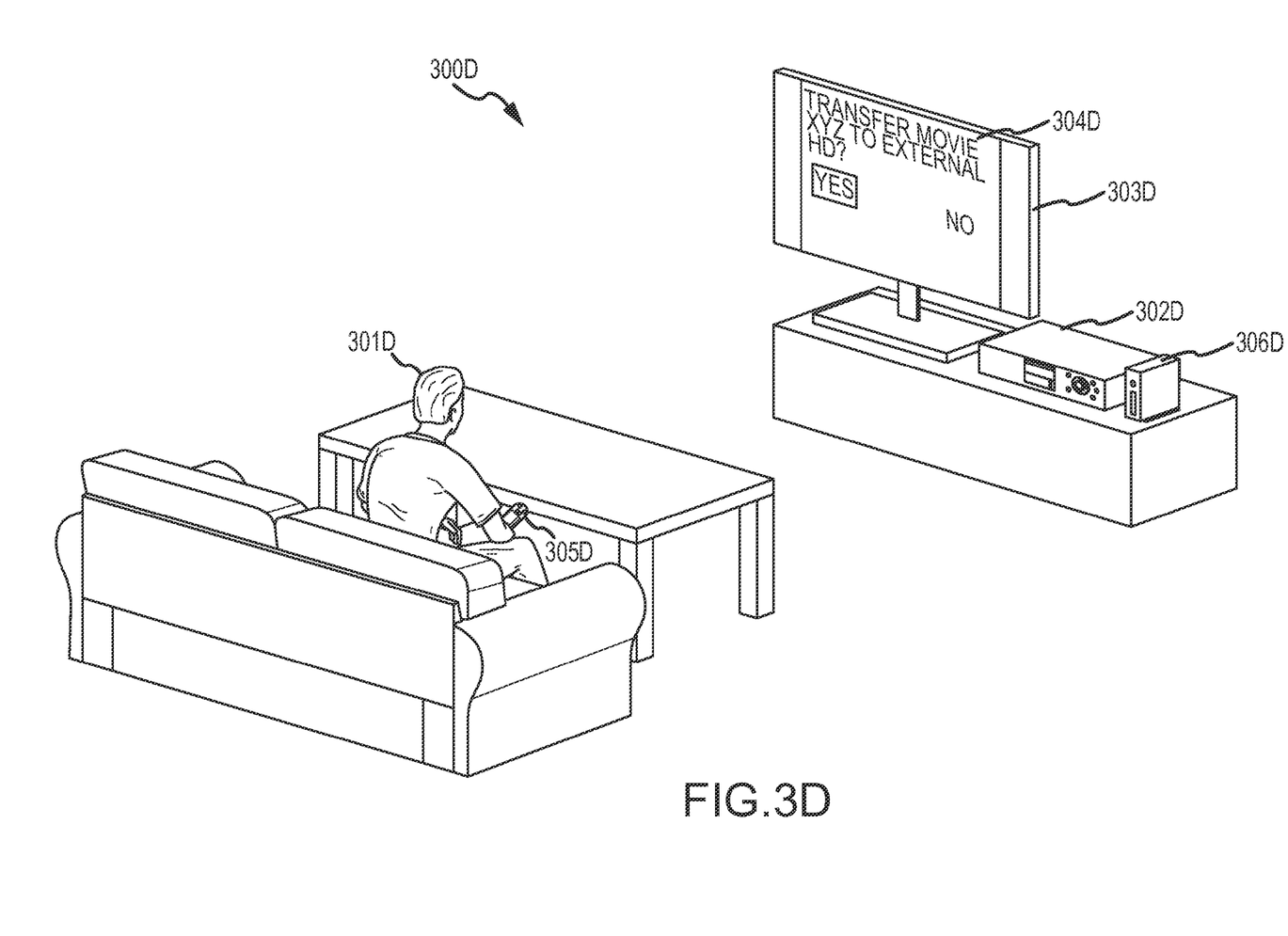
Figure 3E:
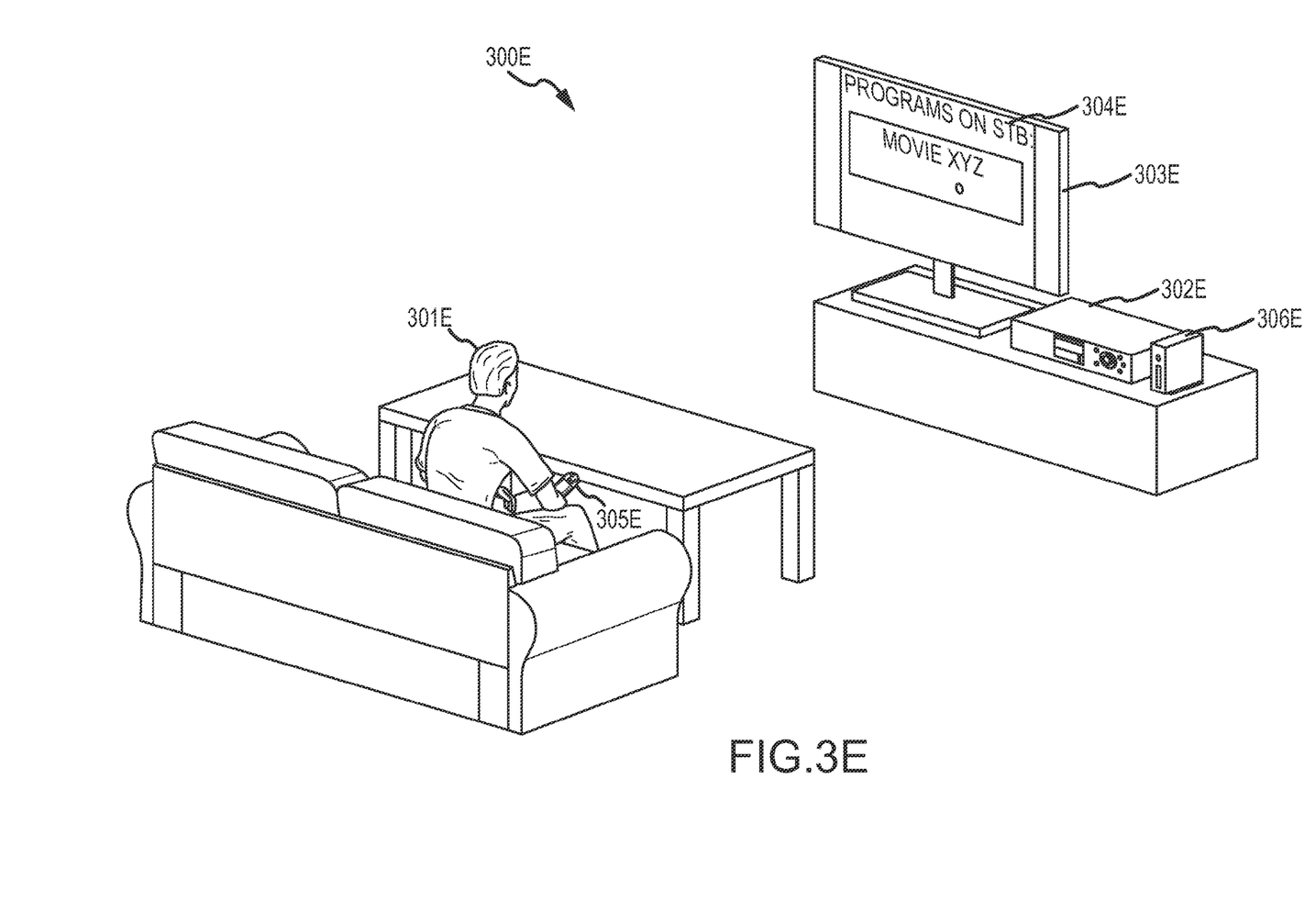

The user 302C may then decide to signal the set top box 302C utilizing the remote control 305C to transfer the Movie XYZ to the external hard drive 306C, as illustrated by FIG. 3D. If the user 302D signals the set top box 302D to perform such a transfer, the set top box 302D may determine that user-specific information for more than one user is associated with Movie XYZ, copy movie XYZ from the set top box 302D to the external hard drive 306D along with the user-specific information identified with the square user identifier, and delete the user-specific information identified with the square user identifier from the set top box 302D. FIG. 3E illustrates the list of programming stored on the set top box 302E after such a transfer. As illustrated, the set top box 302E still stores the Movie XYZ and the user-specific information for the user identified by the circle user identifier, but not the user-specific information for the user identified by the square user identifier (i.e., the user 301E).

Figure 3F:
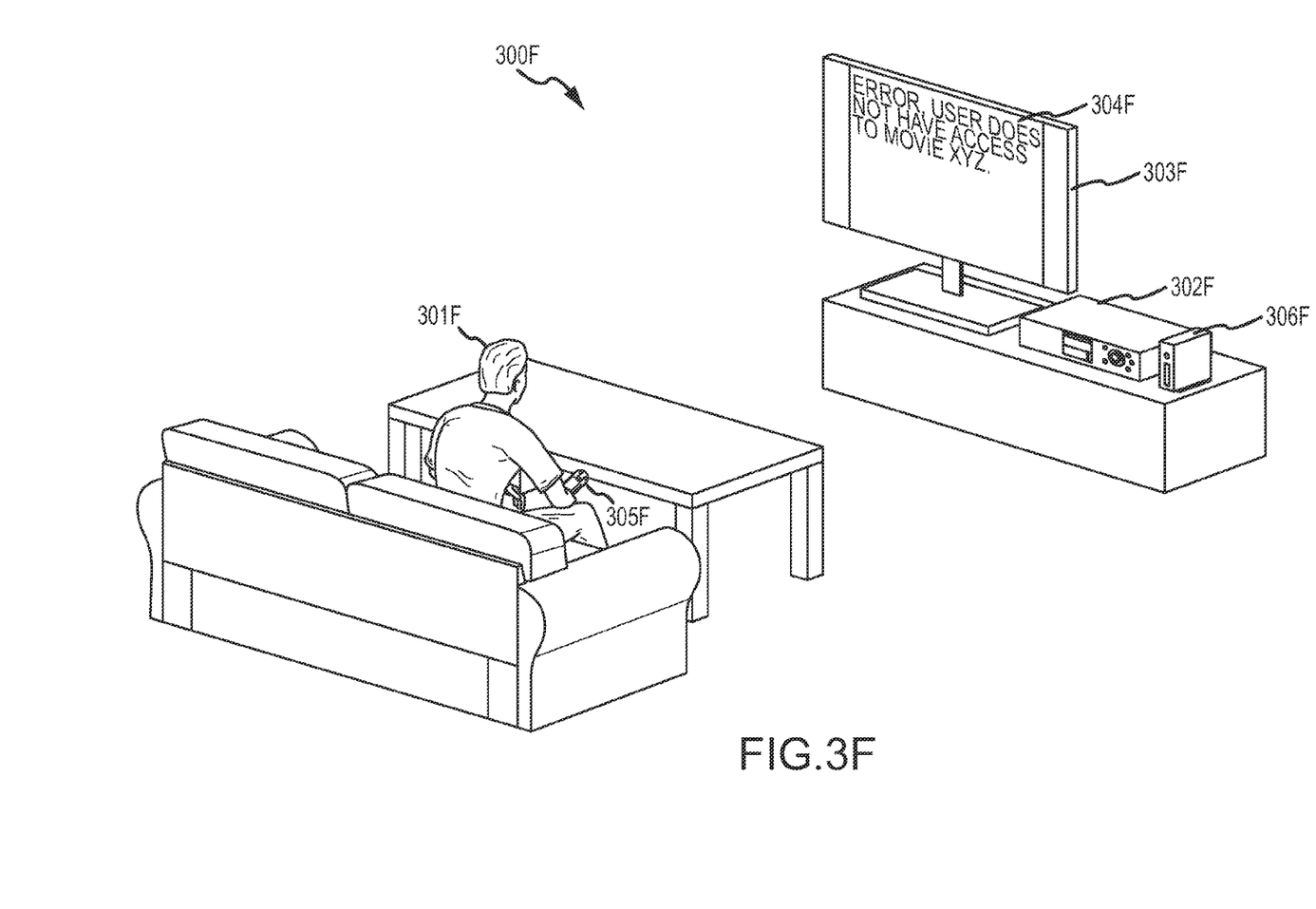
Figure 3G:
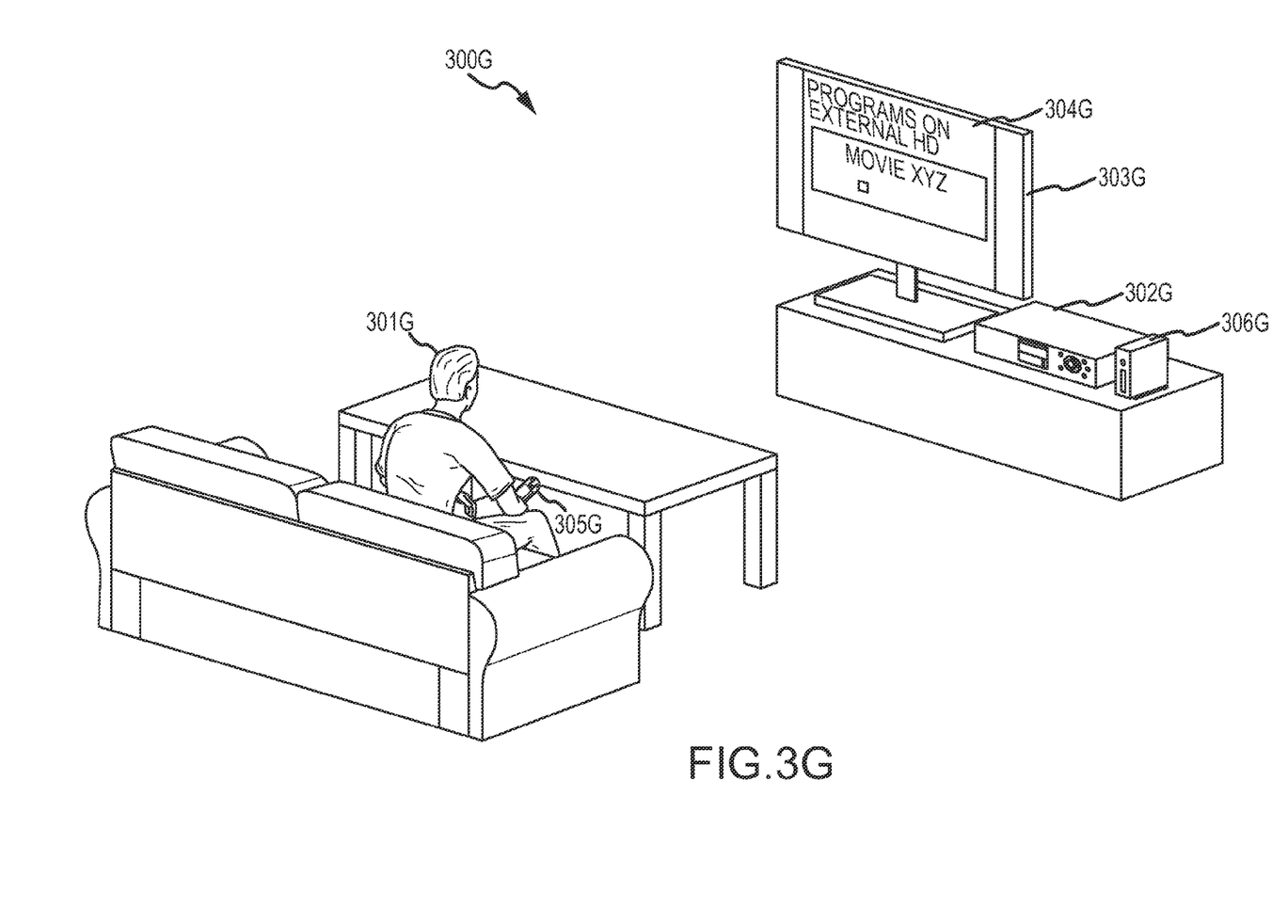
Figure 3H:
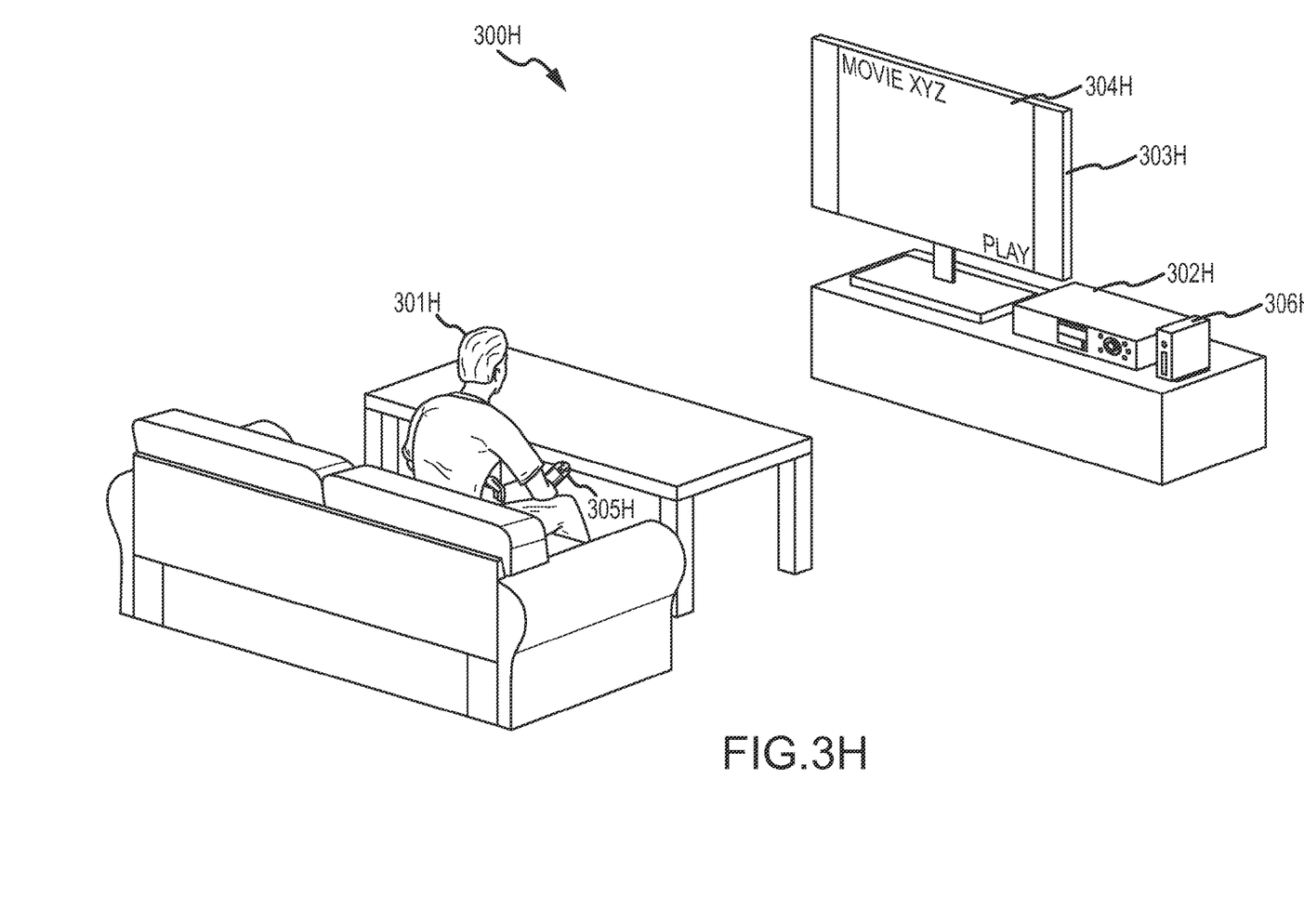

Subsequently, as illustrated in FIG. 3F, if the user 301F attempts to access the Movie XYZ stored on the set top box 302F, the set top box 302F may display an error message on the screen 304F of the television 303F indicating that the user 301F does not have access to Movie XYZ stored on the set top box 302F. However, the user 301F may then access the Movie XYZ stored on the external hard drive 306F. As shown in FIG. 3G, the set top box 302G may display a list on the screen 304G of the television 303G that identifies programs stored by the external hard drive 306G. As illustrated, the external hard drive 306G stores the Movie XYZ which includes last-watched placeholder for the user identified by the square user identifier (i.e., the user 301G). The user 301G may access the Movie XYZ from the external hard drive 306G to play the Movie XYZ from the last-watched placeholder recorded for the user 301G, as illustrated in FIG. 3H.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for handling user-specific information for content during content-altering operations, the method comprising:

storing an instance of content at an electronic device comprising a television receiver having a satellite communication link or cable television communication link;

associating, utilizing at least one processing unit of the electronic device, user-specific information for the instance of content, wherein the user-specific information is received from a plurality of different users and is stored in at least one non-transitory storage medium of the electronic device, wherein the user-specific information identifies each user of the plurality of users who may access the instance of content at the electronic device;

presenting a user identification list to access the instance of content at the electronic device, wherein the user identification list includes identification of at least two users of the plurality of users who may access the instance of content at the electronic device;

receiving, utilizing the at least one processing unit, a request from a first user of the at least two users of the plurality of users to transfer the instance of content from the electronic device to a secondary electronic device;

determining, utilizing the at least one processor, that the transfer will alter the accessibility of the content for the first user of the at least two users of the plurality of users;

requesting, utilizing the at least one processing unit, identification confirmation of which user of the plurality of users requested the transfer;

accessing the instance of content at the electronic device;

transferring a copy of the instance of content to the secondary electronic device;

accessing the user-specific information for the instance of content for the first user;

transferring the user-specific information allowing access to the instance of content for the first user to the secondary electronic device with the association between the first user and the instance of content;

deleting from the at least one non-transitory storage medium of the electronic device the user-specific information for the instance of content for the first user, wherein removing the user information for the first user from the electronic device disables access to the instance of content at the electronic device for the first user; and subsequent the deleting, presenting a user identification list to access the instance of content at the electronic device, wherein the user identification list does not include identification of the first user of the at least two users of the plurality of users.

2. The method of claim 1, wherein the user-specific information received from the plurality of different users comprises at least one of:

a last-watched placeholder for at least one of the plurality of different users, a content instance protected status for the at least one of the plurality of different users, or a content instance access completion status for the at least one of the plurality of different users.

3. The method of claim 1, further comprising deleting the user-specific information for the identified user without deleting the user-specific information for the other users of the plurality of different users.

4. The method of claim 3, wherein the identified user is not able to access the at least one instance of content subsequent to deletion of the user-specific information for the user.

5. The method of claim 1, further comprising requesting to change a protection status of the at least one instance of content and changing a protection status associated with the user for the at least one instance of content.

6. The method of claim 1, wherein the user is prevented from accessing the at least one instance of content stored in the at least one non-transitory storage medium after deletion of the user-specific information for the user from the at least one non-transitory storage medium.

7. The method of claim 6, wherein the user is able to access the at least one instance of content stored at the secondary electronic device after the user-specific information for the user of the plurality of different users is copied to the secondary electronic device.

8. The method of claim 1, wherein said operation of associating, utilizing at least one processing unit, user-specific information received from a plurality of different users with at least one instance of content stored in at least one non-transitory storage medium further comprises:
   prompting each of the plurality of different users to select an identifier from a list of identifiers when the user-specific information is received;
   associating the user-specific information for each respective user of the plurality of different users with the identifier selected by that user in response to the respective prompt.

9. An apparatus for handling user-specific information for content during content-altering operations, comprising a television receiver having:
   at least one non-transitory storage medium that stores at least one instance of content comprising one of audio content and video content as well as computer-readable instructions;
   at least one communication component that receives user-specific information from a plurality of different users; and
   at least one processing unit that associates the user-specific information with the at least one instance of content, wherein the user-specific information identifies each user of the plurality of users who may access the instance of content at the apparatus;
   wherein the at least one processing unit is instructed by the computer-readable instructions to:
   present a user identification list to access the instance of content at the apparatus, wherein the user identification list includes identification of at least two users of the plurality of users who may access the instance of content at the apparatus;
   receive a request from a first user of the at least two users of the plurality of users to transfer the at least one instance of content via the at least one communication component from the apparatus to a secondary electronic device,
   determine that the transfer will alter the accessibility of the content for the first user of the at least two users of the plurality of users,
   request identification confirmation of the user of the plurality of users who requested the transfer,
   access the instance of content at the apparatus;
   transfer a copy of the instance of content to the secondary electronic device;
   access the user-specific information for the instance of content for the first user;
   transfer the user-specific information allowing access to the instance of content for the first user to the secondary electronic device with the association between the first user and the instance of content;
   delete from the at least one non-transitory storage medium of the apparatus the user-specific information for the instance of content for the first user, wherein removing the user information for the first user from the apparatus disables access to the instance of content at the apparatus for the first user; and
   subsequent the deleting, present a user identification list to access the instance of content at the apparatus, wherein the user identification list does not include identification of the first user of the at least two users of the plurality of users.

10. The apparatus of claim 9, wherein the at least one processing unit prompts each of the plurality of different users to select an identifier from a list of identifiers when the user-specific information is received via the at least one communication component and associates the user-specific information for each respective user of the plurality of different users with the identifier selected by that user in response to the respective prompt.

11. The apparatus of claim 9, wherein the at least one processing unit deletes the user-specific information for the user from the at least one non-transitory storage medium without deleting the user-specific information for the other users of the plurality of different users.

12. The apparatus of claim 11, wherein the at least one processing unit prevents the user from accessing the at least one instance of content stored in the at least one non-transitory storage medium after the at least one processing unit deletes the user-specific information for the user from the at least one non-transitory storage medium.

13. The apparatus of claim 9, wherein the user is able to access the at least one instance of content stored in the secondary electronic device after the user-specific information for the user of the plurality of different users is copied to the secondary electronic device.

14. The apparatus of claim 9, wherein the request to transfer further comprises a request to change a protection status of the at least one instance of content.

15. The apparatus of claim 9, wherein the request to transfer further comprises a request to delete the at least one instance of content and the at least one processing unit deletes the user-specific information for the user without deleting the user-specific information for the other users of the plurality of different users.

16. The apparatus of claim 15, wherein the at least one processing unit does not allow the user to access the at least one instance of content once the at least one processing unit deleted the user-specific information for the user.

* * * * *